(12) United States Patent
McCall et al.

(10) Patent No.: US 7,058,710 B2
(45) Date of Patent: Jun. 6, 2006

(54) COLLECTING, ANALYZING, CONSOLIDATING, DELIVERING AND UTILIZING DATA RELATING TO A CURRENT EVENT

(75) Inventors: S. Eric McCall, Lancaster, CA (US); Satoshi So, Fukuoka (JP)

(73) Assignee: Koyo Musen Corporation, Fukuoka (JP)

( * ) Notice: Subject to any disclaimer, the term of this patent is extended or adjusted under 35 U.S.C. 154(b) by 858 days.

(21) Appl. No.: 10/078,494

(22) Filed: Feb. 21, 2002

(65) Prior Publication Data

US 2002/0188522 A1 Dec. 12, 2002

Related U.S. Application Data

(60) Provisional application No. 60/270,128, filed on Feb. 22, 2001.

(51) Int. Cl.
*G06F 15/173* (2006.01)
*G06F 15/16* (2006.01)
*G06F 11/00* (2006.01)
*G06Q 30/00* (2006.01)

(52) U.S. Cl. .................. 709/224; 709/224; 709/203; 709/217; 709/218; 709/219; 709/223; 705/26; 370/230

(58) Field of Classification Search ............... 709/203, 709/217, 218, 219, 223, 224; 705/26, 51, 705/405; 370/230; 707/16, 10, 104.1; 710/17, 710/18
See application file for complete search history.

(56) References Cited

U.S. PATENT DOCUMENTS

| | | | |
|---|---|---|---|
| 6,026,368 A * | 2/2000 | Brown et al. | 705/14 |
| 6,385,604 B1 * | 5/2002 | Bakalash et al. | 707/3 |
| 6,654,724 B1 * | 11/2003 | Rubin et al. | 705/3 |
| 6,704,294 B1 * | 3/2004 | Cruickshank | 370/265 |
| 6,708,166 B1 * | 3/2004 | Dysart et al. | 707/6 |
| 6,763,385 B1 * | 7/2004 | Orfali | 709/224 |
| 6,804,778 B1 * | 10/2004 | Levi et al. | 713/176 |
| 6,859,212 B1 * | 2/2005 | Kumar et al. | 715/744 |

\* cited by examiner

*Primary Examiner*—Ario Etienne
*Assistant Examiner*—El Hadji M. Sall
(74) *Attorney, Agent, or Firm*—Smith Gambrell & Russell

(57) ABSTRACT

Arrangements for collecting, analyzing, consolidating and delivering consolidated and enhanced data from a plurality of sources relating to a current event, to a third party, and reserving the consolidated and enhanced data for internal use so as to create a commercial proactive emergency management and disaster response information system that can also be used for emergent commercial purposes. A data capture device associated with an individual or a location captures data related to a current event or affected site. Incoming data may include raw data, repackaged data, or value-added data from source inputs. Captured data is sent to a centralized command center or distributed command centers where it is analyzed, resolved, correlated and repackaged for use by other parties.

23 Claims, 9 Drawing Sheets

COLLECTING, ANALYZING, CONSOLIDATING, DELIVERING AND UTILIZING DATA RELATING TO A CURRENT EVENT

This application claims the benefit of U.S. provisional application No. 60/270,128 filed on Feb. 22, 2001, which is hereby incorporated in its entirety by reference.

BACKGROUND

1. Field of Invention

The inventions claimed and described herein generally relate to the collection, and consolidation of data from a plurality of sources and to the analysis and use of the collected data. More specifically, they relate to the collection, analysis and consolidation of data that may relate to a current event. These inventions provide apparatus, methods and systems for collecting, analyzing and consolidating data of many types including, but not limited to images (still and video), sounds, alphanumeric data, etc. Data relating to a current event is analyzed, consolidated, enhanced and delivered to a third party and may also be reserved for further use. The inventions are particularly useful in providing proactive emergency management, disaster response and security as well as for other uses and commercial purposes.

2. General Background and Related Art

In this document, various inventions will be described using company/organization names and acronyms because, as of the preparation of this document, that is the most convenient way to describe the best mode for carrying out the inventions and provide a clear description that will be useful for the reader. Particular company/organization names and acronyms should therefore be treated as only a convenient way of describing and not as a limitation. The inventions are not limited to the specific organizations mentioned and/or described in this document. KOYO Musen America, Inc. is the name of a company organized under the laws of the state of Delaware in the U.S. Koyo Musen Corporation is the name of a company organized under the laws of Japan.

In Japanese, KOYO means illumination or insight, and Musen means Radio waves, or wireless. Therefore, KOYO Musen means wireless insight, revelation or inspiration. During normal commerce, the KOYO Information Network (KIN) serves as a comprehensive location-based, proactive data collection, analysis, and value-added information and distribution network. When disaster strikes, the KIN becomes a survival information portal. Emergency Response Information Systems (ERIS) provide information about emergent and emergency events to all stakeholders in a given response area or organization: a nation, state, county, city, area, business, organization, venue or infrastructure: From first alert of the current event through the passing and mitigation of the event's effects. Municipal Emergency Management Systems (EMS) provide some insight for the proper management of an emergency event. A relatively simple example of an EMS is the so-called "911" system. A citizen witnesses an automobile accident and dials 911. An operator answers the call and receives a description of the emergency event from the caller. The 911 operators then decide which assets (ambulance, fire truck, utility company, etc.) of the EMS to deploy, and emergency service providers are dispatched. Such systems are far from perfect, and are always "event-plus-time," i.e., emergency service providers arrive at the event scene some minutes or hours after the event has taken place or begun (in the case of an on-going event). Sometimes, there is a long delay between the time of an event and the initial call to 911. Other times, inaccurate information is provided as to the location, the kind of event, or its severity. When emergency service providers arrive at an accident or event scene, they may discover that additional assets are necessary, such as, for example, special rescue equipment.

Noting these limitations is not intended to cast dispersions on the valiant men and women who serve us in the EMS sector. However, there are limits to the capabilities that can be marshaled (budget, technology, training, etc.). Every communication cycle in the process of event validation extends the time between a first report and mitigation. Let's continue to look at the car accident example. Assume that all of the parties involved are incapacitated and cannot summon help on their own. If the injured parties are lucky, someone will soon arrive on the scene, or a witness to the accident will call for help. A homeowner nearby hears the crash, looks outside of his window and sees two cars in the road. He immediately calls 911 and the police and an ambulance are summoned. They arrive 15 minutes later, or 30 to 45 minutes later if traffic or distance is a problem. After arriving on the scene, the ambulance team may realize that additional resources are required because there are actually seven victims rather than the two reported by the witness. The chaotic nature of early event reporting, the stress of the crisis, the actual duress of injury or witnessing the loss of life, all contribute to a sketchy picture of the first few moments of an emerging event, whether man-made or naturally occurring.

The response system, from the initial 911 call through complete mitigation with the final clearing of debris, can be significantly enhanced by more accurate and complete data collection, analysis, consolidation and dissemination. The inventions presented herein provide and support a commercially motivated, proactive ERIS.

DETAILED DESCRIPTION

Figure 1:
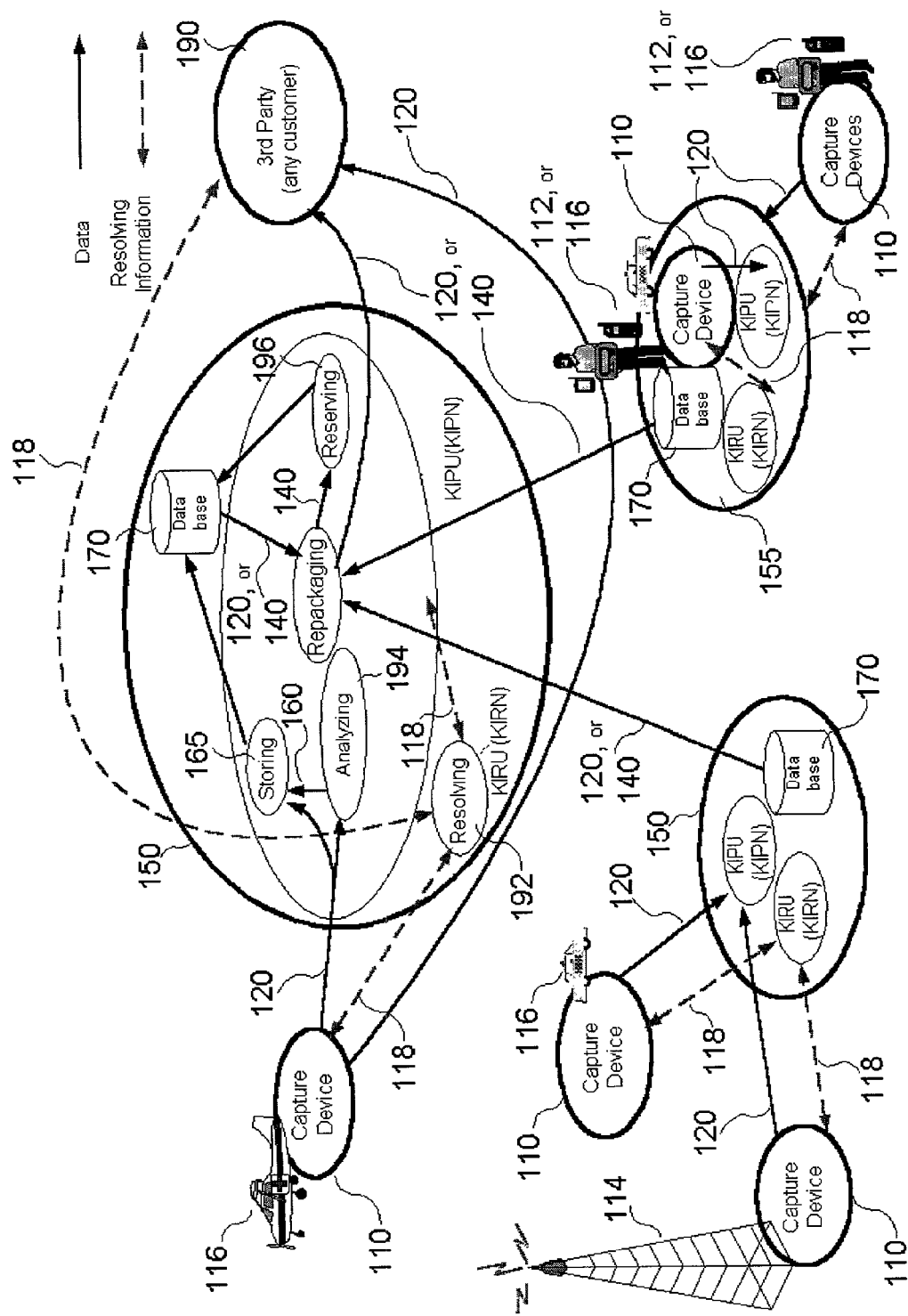
FIG. 1 is a schematic diagram of a first embodiment in which data capture devices work in concert with command or data centers to capture and utilize data.

This patent claims and describes various inventions in terms of particular exemplary embodiments that are also illustrated in the accompanying drawings. Other embodiments are possible and modifications may be made to the exemplary embodiments without departing from the spirit and scope of the inventions. Therefore, the following description is not meant to limit the inventions. Rather, the scope of the inventions is defined by the appended claims.

Using the arrangements, systems and methods described herein, it is possible to mobilize large numbers of citizens on a network. These citizens, while engaged in their normal activities and business, are available to become information gatherers for the network as events take place. They may gather and provide information using a variety of devices, including but not limited to: landline telephones, wireless phones, wired or wireless personal digital assistants (PDAs), e.g. Palm, Pocket PC, combination phones, e-mail devices, internet appliances, etc.) and other types of devices. For example, drivers of vehicles of a commercial vehicle fleet can be outfitted with various types of data gathering devices. During the course of their normal business, the drivers become geographically disbursed and are available to gather information in many different places throughout the day. In addition to commercial fleet drivers, ordinary citizens in both mobile and stationary work environments can be provided with devices to receive and gather data as potential data sources. Thus, our commercial, proactive ERIS includes a connected mobile and wired network of "digital photo-journalists" who can provide various kinds of data and information regarding a current event, without significantly departing from their normal course of business or activity. Collecting as much information as possible, from as many digital photojournalists as are on, or near, the scene (rerouted to gather additional information), using the techniques described herein to analyze incoming data in real-time, and provide more complete and accurate data to municipal EMS workers, while they are still in route. This approach can provide significant enhancement of EMS information collection and dissemination. The various techniques described herein can be used to provide better data to various agencies, such as the National Guard, the federal government (e.g. CIA, FBI, NSA, DoD, FEMA & EAS), state authorities (DES, CDC, PH, NG), local municipalities (Police, Fire, Search & Rescue, HAZMAT, Bomb Squads, etc.), and discerning individuals (trained as CERT team members and the general citizenry) during times of emergency and crisis.

The inventions presented here, while having particular application to emergency and security management, also have significant commercial applications. For example, emerging Location Based Services that provide "Where am I? What's near me? How do I get there?" services, will be able to also provide information to answer questions such as: "What's going on near me? Can I get where I want to go safely? What conditions will I find when I arrive?"

The inventions described are inspired in part and made possible by the convergence of pervasive wireless access to the Internet, the coming ubiquity of digital wireless photography and video, the rapid increase in the sophistication of existing commercial cellular and radio communication infrastructures, and the present inadequate state of information collection for the EMS. However, the reach and impact of the inventions described herein are much broader than just emergency response. The inventions described herein further include systems and methods for the management of commercial current event data.

One concept of the inventions is the acquisition from a plurality of sources of various kinds of data relating to a current event, sending that data to a central repository for analysis, analyzing the data and repackaging it to provide a more complete picture of the event, thereby creating "value-added information," and providing that value-added information to those who need or want it on a subscription, per event, or contractual basis.

A benefit of the inventions is to provide a commercial superstructure to the traditional EMS communications infrastructure, providing a proactive commercial ERIS. For example, there are hundreds of fleets of vehicles on the roads and thousands of employees on foot that are pursuing other businesses each day. These fleets, such as FedEx® or UPS®, have dozens of trucks that cover every street delivering packages. On our nation's highways are hundreds of trucking fleets moving cargo around the country, with thousands of trucks on the road at any given minute. These fleets will come across an accident or an event of human interest more often statistically than the municipal assets (which many times do not leave the garage until after an emergency is reported and verified).

Once someone calls 911 or a news agency, the inventions will energize every registered digital citizen's resources in the field, near this event, in ways that the municipal response or media simply cannot. As such, an embodiment of the inventions is to partner with the current EMS as a proactive commercial ERIS by partnering with corporations like FedEx, UPS, Coca-Cola® (delivery people), trucking freight lines, the U.S. Post Office (vehicles and mail carriers), the meter readers, and individual citizens, etc., to collect all the input possible in the process of developing a composite, more complete picture of the event in progress. It is approximated that every three minutes, a FedEx truck, a UPS truck, a Coca-Cola truck, or any one of a number of other commercial vehicles, or some individual will pass by any given street corner in a city. These potential "digital assets" are pursuing other business interests, and all have pre-existing two-way communication devices with their bases of operation. In other words, these companies or people pursuing other businesses already have some sort of communication devices such as cellular phones, radios, satellite communications, and some sophisticated freight transport systems (air, road and rail) even have satellite communication devices that include GPS (global positioning system) data. The inventions outfit these commercial (and private citizen) communication systems with additional hardware, software and/or firmware so as to enable them to collect data for the KIN. These digital images, digital video and/or audio samples taken on the scene will be sent to a central repository to be analyzed and repackaged for redistribution. Our inventions also allow for the pre-placement of data collection devices and sensors in areas known to be potential disaster or crisis sites (volcanoes, mountains that routinely have rain and landslides, earthquake areas, highly trafficked areas like automobile intersections, subway stations, etc.) or heavily populated or strategically important venues and infrastructures (airports, stadiums, manufacturing, processing and storage facilities, densely populated downtown areas, etc.).

The value-added data provides a more complete and accurate picture of an accident, an emergency, a disaster, a commercial or sporting event at a given venue, a strategically valuable infrastructure (airports, railways, atomic power plants, food or petroleum processing plants, or any human-interest event at any given location, venue, or infrastructure, to those who need or want it.

There are various levels of involvement. For example, if a delivery truck has to make a delivery by a certain time and comes across a human-interest event but cannot stop, the driver of the delivery truck can just slow down, push a single button on the dash board, and begin an audio commentary, while collecting either digital images or video during the drive-by. This first data of the event is sent to a central repository to be analyzed, repackaged and provided to the right people. The driver can just say "Hey, I am on I-66 heading west just before the 495 beltway, there is a car on the side of the road with its hood up and there is smoke coming out of it, please send help," and he can keep on driving. A benefit of our inventions is that in a case like this, the driver's commercial interest is barely perturbed at all.

In the above example, we use the first report to trigger other "digital assets in the area" to also be on the look out and to begin data collection. If a driver of a delivery truck has some flexibility, he can choose to slow down for a better data capture, or even pull over to the side of the road, take out his portable wireless device and capture audio, video, and/or take digital images of the event and call for help. The video and/or audio data are sent to a central repository where they are analyzed, repackaged to create "value-added" real-time information of the event in progress, and provide this "value-added" information to the right people. These event data can become of great importance later on to the municipal agencies, media, insurance adjusters, other carriers, etc. Accordingly, a core aspect of our inventions is to cooperate with the community to foster altruistic values, as well as to provide financial incentives to individuals, corporations and businesses that are pursuing other businesses to partner with us as providers of the "value-added" information.

A benefit for each subscriber or entity logged onto our system is a fair exchange of partial information of a current event in return for a composite one. For example, a customer gives the KIN a piece of information that will be placed in context, consolidated with other input and returned to the customer. What is returned is an emerging composite picture of what is going on. Imagine each of four digital assets coming upon an event from four different directions. As a result, we collect data related to the same event from four different sources. This allows us to create composite or "value-added" information. The "value-added" information is then provided in real time to subscribers. In other words, our system is proactive. It energizes fleets, teams, and anyone subscribed to the KIN having two-way communication devices by giving them the ability to gather information and instructions on what to document that can be potentially sold to an interested party. As an example, currently if a delivery truck driver discovers that there is traffic jam on highway I-66, he calls headquarters to say "Hey, there's a traffic jam on I-66 at the 495 beltway, don't let anymore delivery trucks come out here, they're just going to get boxed up." With these inventions, that information is placed in context for all the other fleet managers as valuable information and can be sold to other delivery companies or businesses. The one who provided information that is ultimately sold to another will be rewarded. This is an incentive for gathering information. We receive, analyze and consolidate various pieces of information and can provide that information in a desired format to consumers of that information. There is a real time market for the emerging information and our system provides a way to get that emerging information to consumers of that information and compensate the information gatherer, which provides an incentive for their participation.

Another benefit of our inventions is commercial use in the area of health, environmental and safety disaster recovery. For example, imagine a chemical company having a huge manufacturing plant covering several thousand acres of land, a few thousand employees, billions of dollars worth of chemicals and equipment. Something goes wrong and a catastrophic loss or explosion results. The company may or may not be liable and wants to document that it was not negligent. The company needs to establish and identify the events and conditions leading up to the loss and to determine culpability for the loss. Our arrangements provide equipment such as video cameras, audio equipment, sensors, measurement devices, etc., and the KIN will provide them with the ability to collect data from the plant quickly, make an instantaneous assessment of what went wrong, so as to better prepare the corporation to communicate with their entire value network including such stakeholders as: authorities, insurance people, lawyers, employees, vendors or the media more rapidly and with more accurate information than ever before.

Yet another benefit of our inventions is enabling commerce over our network where people share consolidated data. For example, a vice-president of sales knows he is coming into the holiday season and has a Christmas display in 500 stores that must be validated; he can spend three weeks flying to all those stores and check them personally, or he can have every store manager take a digital picture and upload it to our service. The KIN will analyze all the pictures, create an exception report listing those displays that are out of tolerance, and the vice-president will know which stores to call or visit about their displays instantly.

The most potent use of the ERIS is the ability to provide content to the media during a crisis, and later, to the motion picture, television, and documentary industry after the event. Many times during an event, the media will send assets to the site of an event, but there are several hours to several days delay between the event and the point where the media makes the assessment that it will be commercially "worth" sending out the crews. However, with our ability to tap into existing assets in the field, there will be many "minor" stories that do not warrant dispatching a fall crew, where the media will be content to access "amateur photo-journalist" content from the KIN, purchasing content at a dramatically reduced cost. Even on occasions where full production crews are dispatched to a scene, the sheer numbers of people participating in our system means that we are more apt to get more useful footage, snapshots, eyewitness testimony, and the like, to resell to the media. After an event has passed, if it was newsworthy, content submitted to the KIN may appear in the plot of a movie, a television show, or a documentary. We are also able to sell archival information to these media sources.

Our inventions include apparatus, methods and systems that provide a human connection and communication tool. Our inventions help to mitigate the suffering around the world that occurs when a natural (hurricane, volcano, earthquake, fire, flood) or manmade (terrorist attack, industrial accident, asymmetric warfare) disaster strikes a region, by providing accurate and timely information to those who are equipped to help alleviate that suffering to improve our human community's lot in life. Our inventions foster cooperation and altruism, bringing the "electronic village" one step closer to real connectedness. For others, the promise of a profit motive will encourage them to participate in our system.

FIG. 1 illustrates a first embodiment, which is a method for capturing and utilizing data. The method for capturing and utilizing data provides at least one data capture device (110) that is provided to at least an individual (112) or mounted on at least a structure (114) or mobile platform (116); resolves legacy system data and appetite requests (118) and captures new, unique raw data (120) from the data capture device (110) in the proximity of a current event, and/or a nearby potentially affected site, wherein incoming data includes the captured raw data (120) and/or repackaged data (140) from the source inputs. The repackaged data (140) is value-added data. Captured raw data (120) is sent to a centralized command center or distributed command center (150) which has at least one centralized server or distributed server for processing to resolve which portion of the data is required to go forward. Captured raw data (120) and analyzed data (160) are then stored in a storing server (165) and/or a database (170) dedicated to event data. The captured raw data (120) is repackaged with the event data indicative of an event in progress, and all the data is repackaged as value-added data (140). The value-added data (140) relates to an event and includes at least one of the captured raw data (120) or data developed through an automated analysis of the captured raw data (120) and the event data. The captured raw data (120) or the repackaged/value-added data (140) is then sent to at least one third party (190).

Figure 2:
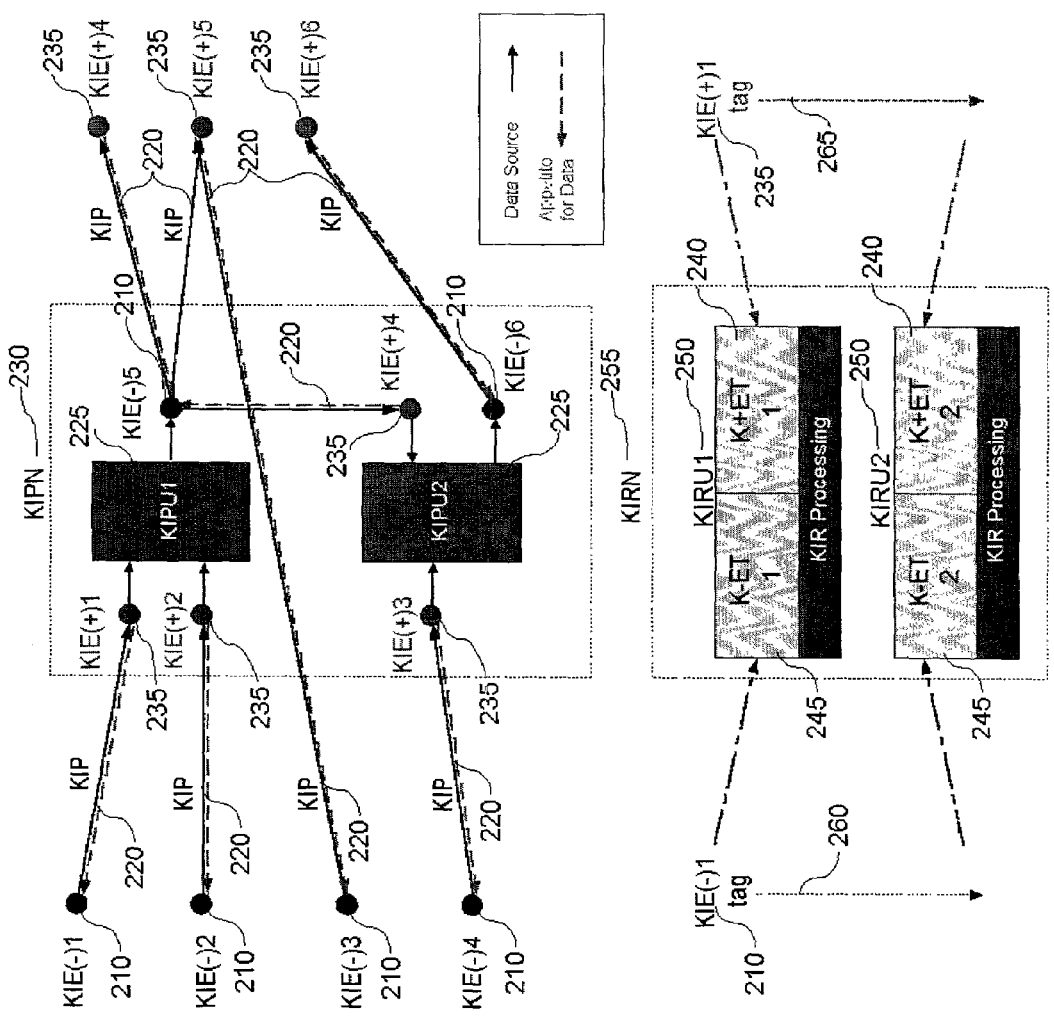
FIG. 2 is a schematic diagram of the KOYO Information Network (KIN) for information exchange.

FIG. 2 is a schematic diagram of the KOYO Information Network (KIN) for information exchange. The arrangement is based on the "push" and "pull" technology for information exchanges between the KIN and every individual, corporation, institution or organization subscriber as illustrated in FIG. 2. An example of push technology is a KIN originated pager, cell-audio, cell-text message, fax, web, cable, radio, net radio, cable, TV broadcast, etc., where the data is prepared according to KIN protocols, and then broadcasted. An example of pull technology is a Resolution Engine request from a KIN web portal, a request for notification, a database query for emergency business continuity event information, etc.

The push and pull technologies are unique in the present inventions in that the KIN tries to resolve and automatically provides answers that satisfy all known appetites for information. The KIN provides this unique real time response by providing a system having the capacity to gather an unlimited number of raw data inputs and automatically assigning tags, or meta-data structures that define the data. As a result, the KIN analyzes, repackages, and stores the results in servers as "new" data on the event. This allows the KIN to repackage its comprehensive contents on the fly, instantly creating value-added information that will satisfy each subscriber request.

With the KIN, notification of an event as it occurs and notification of regular or periodic updates of an event can happen concurrently. That is, in some cases, some client entities will want to be notified when a general event happens. In other cases, some entities will want regular or periodic updates on the status of certain events or sensors. So, in the first case, the "information circuit" is considered to be "normally open," meaning that no notification will happen, and the entity is not requesting any information, until an event happens. Once the event happens, it "closes" the information circuit, and the KIN will push data and information it deems relevant (important) and in the general population's or the specific subscriber's interest. However, by subscription, other entities will say, "If this happens, let us know, and monitor these sensors on the following periodic basis." In that case, there will be a regular flow of data to the entity from the KIN, because of the requirements and requests found in the subscriber profile and from dynamic requests. In the former case, the KIN decides whether event information is important and broadcasts, as KIN will broadcast the event information based upon a preordained subscription request and profile. In the second case, the entity decides what is important, and requests regular status reports from the KIN in advance, regardless of whether an event is happening or not.

As stated above, during the next event, such as a terrorist attack, chemical spill, or bad traffic accident, the KIN will notify all subscribers in the general area of the event and provide a preliminary condition report, and will give each entity on the system the opportunity to request more information about the event. So, the origination of that data is event driven. However, if an entity contracts with, e.g., a home security company, that entity will want the home security company to constantly monitor the protected area, and immediately notify the entity when an event happens. So, this is an example where the entity requests periodic testing of sensor inputs, with action required if deviation is found such as: "if someone enters the protected area, instantly give me a message". The KIN will provide industry/entity specific information based upon subscription requests and the profile unique to each entity.

The KIN operates on a unique concept of information theory. A direct analog is the electrical energy principle. An entity's source input is like energy, expressed as an electron (−); a requirement from an entity for specific information is like an appetite for that energy (+). When an entity has inputs, data, or information regarding an event (or any other communication content of importance), it is called KIE(−) (210), that is, the minus sign of KIE(−) (210) depicts a source of data or information. The Information Entity here means the individual device or sensor submitting the data, and/or information regarding an event, or data about the event environment.

When an entity has an appetite for inputs, data, or information regarding an event (or any other communication content of importance), it is called KIE(+) (235), that is, the plus sign of KIE(+) (235) depicts an appetite for inputs, data or information regarding an event, and the Information Entity, or subscriber that requested them. It works like the electron principle. The (−) and (+) are attracted to each other. The input (−) is like an electron that has energy, or value. In electronics, the (+) is called a hole. The (+) is the need for, or acceptance of that energy, value, or information. So, KIE(−) (210) is drawn to the vacuum where KIE(+) (235) exists, and KIE(+) (235) is hungry for KIE(−) (210). Stated this way, the KIN's role is to collect data, analyze and repackage the data with existing knowledge, and provide the new information to satisfy every entity's appetite for the new information.

KIPU (225) is a KOYO Information Processing Unit, which is a processing engine that calculates from each KIE(−)(+) for input and then creates new KIE(−)(+) for output using numerical calculations, logic operations, artificial processes (fuzzy logic and artificial intelligence), pattern recognition, inductive and deductive logic to identify and catalog each KIE(−)(+).

KIPN (230) is a KOYO Information Processing Network that comprises a plurality of KIPUs (225) that are centralized and/or distributed as virtual logical devices to render images of an event as it unfolds, as well as to preserve time slices of the event for later study and analysis.

KIP (220) is a KOYO Information Pipe. KIP (220) is a virtual pipe that connects each KIE(−) (210) to each KIE(+) (235) directly. The pipe is a virtual connection between the sensor or input device, through any communication conduit (wired and wireless), through the Internet and to the KIN, back out to satisfy the appetite of the originating entity, regardless of physical deployment at each stage of the communication chain.

KIR is KOYO Information Resolution. KIR is the Resolution Engine technology that brings KIE(−) (210) and KIE(+) (235) together in real time. KIR can be seen as the agent or controller that resolves each encounter between an input and all the known appetites for that data; and a request for data, and all the known inputs that could serve to satisfy that request. In the case of KIE(−) (210), KIR searches the current state of a KIE (+) (240) look up table (a dynamic look up table of existing requests) to match all of KIE(−) (210). In the case of KIE(+) (235), KIR tries to find all the instances of KIE(−) (210) that will satisfy it, along with data and information uniquely created by the KIN. The scope of the encounter, expressed as KIR between KIE(−) (210) and KIE(+) (235) is realized by K−ET (245) (KOYO-Entity Table (the look up table for K−ET (245) is a dynamic look up table of existing data inputs)), K+ET (240) (KOYO+ Entity Table), KIRU (250) (KOYO Information Resolution Unit, also known as a Resolution Engine), which processes to resolve connections between data inputs and requests, and KIRN (255) (KOYO Information Resolution Network), which is the network that ties Resolution Engines together.

K−ET (245) is an information table that publishes all KIE(−) (210) event profile tags (260). Tags (260) are metadata elements used to provide context for information with enough granularity to resolve any and all KIE(+) (235) requests. In K−ET (245), only tags (260) are registered, because the actual content may be too large, e.g., a streaming video segment that you would only send after a direct match was found. At KIRU (250), several thousand concurrent tags per second may be resolved.

K+ET (240) is an information table that registers all KIE(+) (235) event profile tags (265). Tags (265) are meta-appetite elements used to identify the appetite subscriber or request with enough granularity to resolve any and all KIE(−) (210) opportunities. In K+ET (240), only tags (265) are registered, because the actual subscription profile or request may be too large, e.g., a corporation's subscriptions may be too large or complex, and you would not want to move the entire subscription profile around until a direct match was found.

KIRU (250) comprises of K−ET (245), K+ET (240), and enough parallel processing units to resolve each encounter. As transaction load increases, more KIRUs are added in real-time, on the fly, with hot swapping (in case of a failure), and hot addition (in case of increased network loads).

KIRN (255) comprises of multiple KIRUs (250) that are co-located and centralized and/or distributed as a virtual, logical Resolution Engine that work together to find the matches between each K−ET (245) and K+ET(+) (240).

KIE(−) (210) is created when an emergency or unique information event occurs and is recorded by any entity's data input device or sensor. A KIE(+) (235) request is created when a requirement is communicated to the KIN from any entity on the system. In other words, a KIE(−) (210) data element is created when an event is captured and that data is tagged. The KIE(−) data element is looking for a KIE(+) (235) appetite to resolve itself with. A KIE(+) (235) appetite is created when an entity expresses a unique requirement to the KIN, and this requirement or appetite tag looking for suitable input from the appropriate spectrum of KIE(−) (210) data inputs and then the KIRU (250) resolves the answers (as to which inputs can find their appetites to satisfy, and which appetites can be satisfied by which inputs) and the KIN will serve data to the appetites as required. Thus, KIE(−) (210) data acts to bring in event data and its tags to the KIN. However, KIE(+) (235) appetites work in two ways. First, the raw appetite is sent to the KIN, to see if there is already an answer in the system, if so, the system brings it back to the source of the requirement. Each one of KIE(−)(+) can be connected to and receive data and information from an infinite numbers of entities. Both KIE(−)(+) are not created only when an event and/or requirements happen, but are also created dynamically by KIPU (225) calculations. KIE(−) (210) data can be created by the KIPU (225) and represents value-added information that is created from all the input data in the system, in real time. KIE(+) (235) appetites can be created by the KIPU (225) when KIE (+) needs more input to resolve a calculation or to fulfill a compound, timed, or complex request.

The data capture device (110) shown in FIG. 1 may be a mobile, a portable device, any household appliance (e.g., a television or set top box), or other information terminals. The data capture device (110) captures audio, video, GIS/GPS, digital imagery, text capture, any other data, electrical signals, or instrument readings. The data capture device (110) may be unmanned, operating independently or according to a schedule. Specifically, each of the data capture devices (110) includes at least one wired (114) or mobile (116) wireless data collection and dissemination device such as a desktop computer, a portable laptop, a handheld computer, a wired camera, a data recorder, etc. The data capture device (110) may also be a beeper, a pager, a two-way text messaging device, a wirelessly connected PDA, a cellular phone, a radio, a wirelessly connected digital camera, a VCR, a DVR, and the like.

The source of the captured data (120) is reported to the Resolution Engine (192) and the data is sent either directly to another data capture device (110), an embedded server within a capture device (155), a third party (190) including another computing platform which is not working in concert with the KIN or to both the centralized and/or distributed command center (150) with centralized and/or distributed server processing, respectively. Each of the centralized and/or distributed command centers (150) may also function as a single logical server farm or as special interest servers processing a single kind of data used by several of the servers (150) as a single logical device that stores a comprehensive database (170). In the first arrangement, captured data is sent to other data distribution centers (150), and data relaying is carried out between the centers with little or no command and control features. The captured data (120) is analyzed by an Expert Process (194) using techniques such as mathematical formulas, logic operations, artificial reasoning, artificial intelligence, deductive and inductive reasoning, historical analysis, trend analysis, pattern recognition and other analysis methodologies. The repackaged data (140) is provided in real time, to other consumers at a later time, or is reserved for internal use.

The captured data (120) from the at least one data capture device (110) is simultaneously sent to the centralized and/or distributed command centers (150) with centralized and/or distributed server processing (150), and to information storage and distribution centers having little or no command and control features. Each centralized and/or distributed command center (150), with centralized and/or distributed server processing, comprises a distributed database operating with a plurality of servers over multiple locations, with multiple mirrored versions of the distributed database. Stored data is replicated periodically to a plurality of data servers located in different places so as to prevent data loss when individual servers are lost or malfunction, effectively performing as clustered backup servers.

The captured data related to the current event is sent from the at least one data capture device (110) to centralized and/or distributed command centers (150) over a variety of commercial, municipal, public and private communications networks: wired, POTS, and wireless, e.g., and cellular and radio. The subscribers provided with data capture devices (110) are human beings (112) who are close enough to the current event to capture the data related to the current event and/or the surrounding area using the at least one data capture device (110). Individual subscribers may be any member of the public such as a private citizen, a municipal worker, a commercial or corporate employee, a media employee, a civilian or CERT volunteer, a member of the military, or any other individual authorized to make measurements to capture the current condition of the event. Animals may be provided with a data capture device (110) also including trained animals working with human beings for the purpose of data collection. Individuals may operate an individual vehicle as a mobile data collection platform; or a group of individuals may operate a fleet of vehicles as a coordinated fleet of data collection platforms, from a municipal service fleet, a commercial fleet, a military fleet, or an ad hoc collection of citizen-owned vehicles.

The current event may be a number of events such as an emergency event, a commercial event, a multi-media event, a public interest event, a public service announcement, a social event, a government announcement or proceeding, a military action, or any other human-interest event. The current event may also be manmade (terrorist attack or industrial accident) or a naturally occurring accident, disaster, or medical crisis in a group or with an individual, or the activities surrounding the prevention of a disaster in large venues, strategic infrastructures, and densely populated areas.

The structure used may be a building, a bridge, a pole, a tower, a mounting platform on a mountain, or any other fixed, stand-alone structure (114). The at least one third party (190) may be a private citizen, a news gathering agency, federal, state and local agencies, a municipal or military emergency response organization, an infrastructure company (gas, water, electric, phone, traffic, etc.), an Internet portal, a web enabled access point, a film and/or documentary company, an insurance company, or any other group or organization that desires access to the raw or resolved data. As used herein, the municipal emergency response organization represents all emergency management agencies, all public information agencies including weather bureaus, flood watch organizations, earthquake centers, police departments, fire departments, search and rescue teams, hazardous materials teams, bomb squads, anti-terrorist squads, the national guard, a municipally organized citizen, CERT or volunteer group, a military organization, or any other group established and maintained by volunteer effort, commercial, private, or public funds.

The repackaged data (140) and the raw data (120) may be used commercially by selling such data to a third party (190). The repackaged data (140) and the raw data (120) may also be stored in a database (170) for internal use, and for resale to a third party (190) at a later time. The repackaged data (140) may be value-added data, including captured data (120) and the composite data (140) that describes the whole event, and is being provided to the at least one third party (190) in real-time, time delayed, in a programmed broadcast, on demand, event activated, and stored in reserve (196) for internal use, and for resale to at least one third party (190) at a later time.

Figure 3:
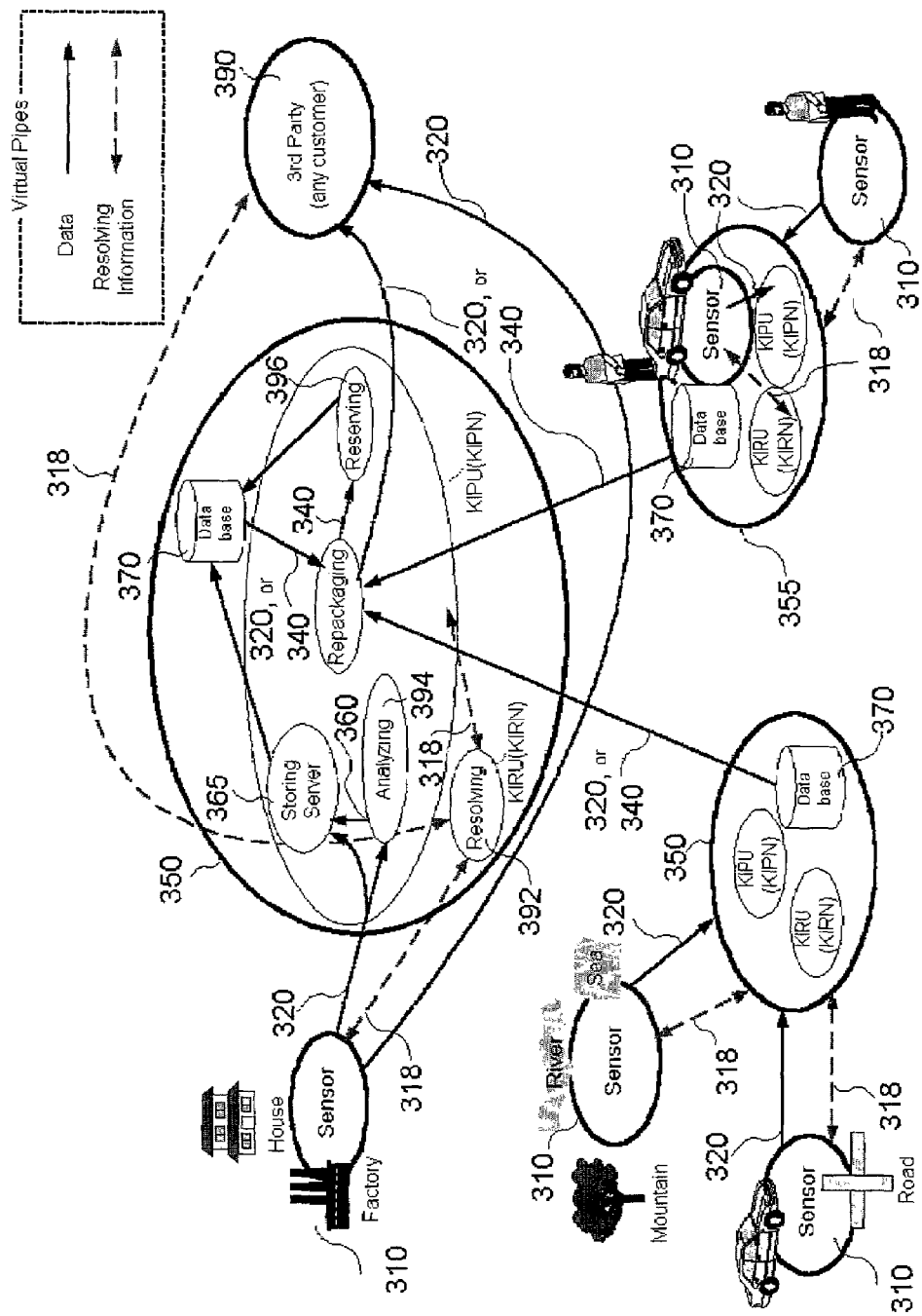
FIG. 3 is a schematic diagram of a second embodiment in which sensors work in concert with command or data centers to capture and utilize data.

FIG. 3 is a schematic diagram of a second embodiment in which sensors work in concert with command or data centers to capture and utilize data. The same or similar features of each embodiment of the inventions operate in the same or similar fashion as those of the other embodiments, unless stated otherwise so as not to be repetitive. The arrangement for capturing and utilizing data comprises: at least one sensor (310) for measuring data that may relate to an emergency condition, capturing data from a current condition, using the at least one sensor (310) to capture data (320) in the proximity of a current event or condition—wherein the incoming data includes raw data (320) and/or repackaged/value-added data (340) from source inputs, sending the captured data (320) to a centralized and/or a distributed command center (350) with centralized and/or distributed server processing, storing the raw and analyzed data (365) in a database (370), repackaging the captured data (320) with the event data indicative of an event in progress, providing the repackaged data (340) including the captured data (320) as composite event data (340), developing an automated analysis of the data and the event, and providing the raw data (320) and the repackaged data (340) to the at least one third party (390).

The sensor (310) is a device made available to any member of the public such as a private citizen, a municipal worker, a commercial or corporate employee, a media employee, a civilian volunteer, a member of the military, or any other individual authorized to make measurements for the KIN to capture the current condition of the event. The sensor (310) may be deployed in a predetermined area to make measurements relative to any event. The predetermined area is an area that has an historical potential for an event to erupt, or a location where an event is preplanned. Other locations include: an area in close proximity to the event, an area that provides a unique perspective on the event, like a mountain top, or the roof of a skyscraper, an area further up or down a cascading event chain, like a river's path, a land slide's path, or any area that is likely to be affected by or will likely effect the onset of events related to potential emergent situations, large venues, infrastructures, and densely populated areas, and/or any other location where events worthy of documentation are likely, or are planned to occur.

The captured data (320) is periodically sent to the centralized or distributed command center (350) indicating the current conditions at the at least one of the predetermined areas. Sensor (310) may be a measurement device worn by or attached to a person indicating the individual's status, including "man down" information, vital signs, orientation (vertical or horizontal), and GPS location information. The sensor (310) may also be a water level, vibration, temperature, weather, structural, gate/door/section open/close condition, machine status, or any other type of sensor. The sensor may be analog, digital, RFID or any combination thereof. Other sensor types include sensors to measure environmental conditions suitable for human life, with measurements taken in the vicinity of people, or any other location that may affect human life, including biometric authorization and authentication and bio-chemical hazard assessments.

Similarly to the first embodiment, the captured data (320) of the second embodiment related to the current event is sent from the sensor (310) to the centralized and/or distributed command centers (350) over a variety of commercial, municipal, and private communications networks: wired, POTS, and wireless, e.g., cellular and radio as in the first embodiment.

The sensor (310) captures audio, video, GIS/GPS, digital imagery, text capture, RFID information and any other electrical signals or instrument readings. The repackaged data (340) and the raw data (320) function similarly to that of the first embodiment.

Figure 4:
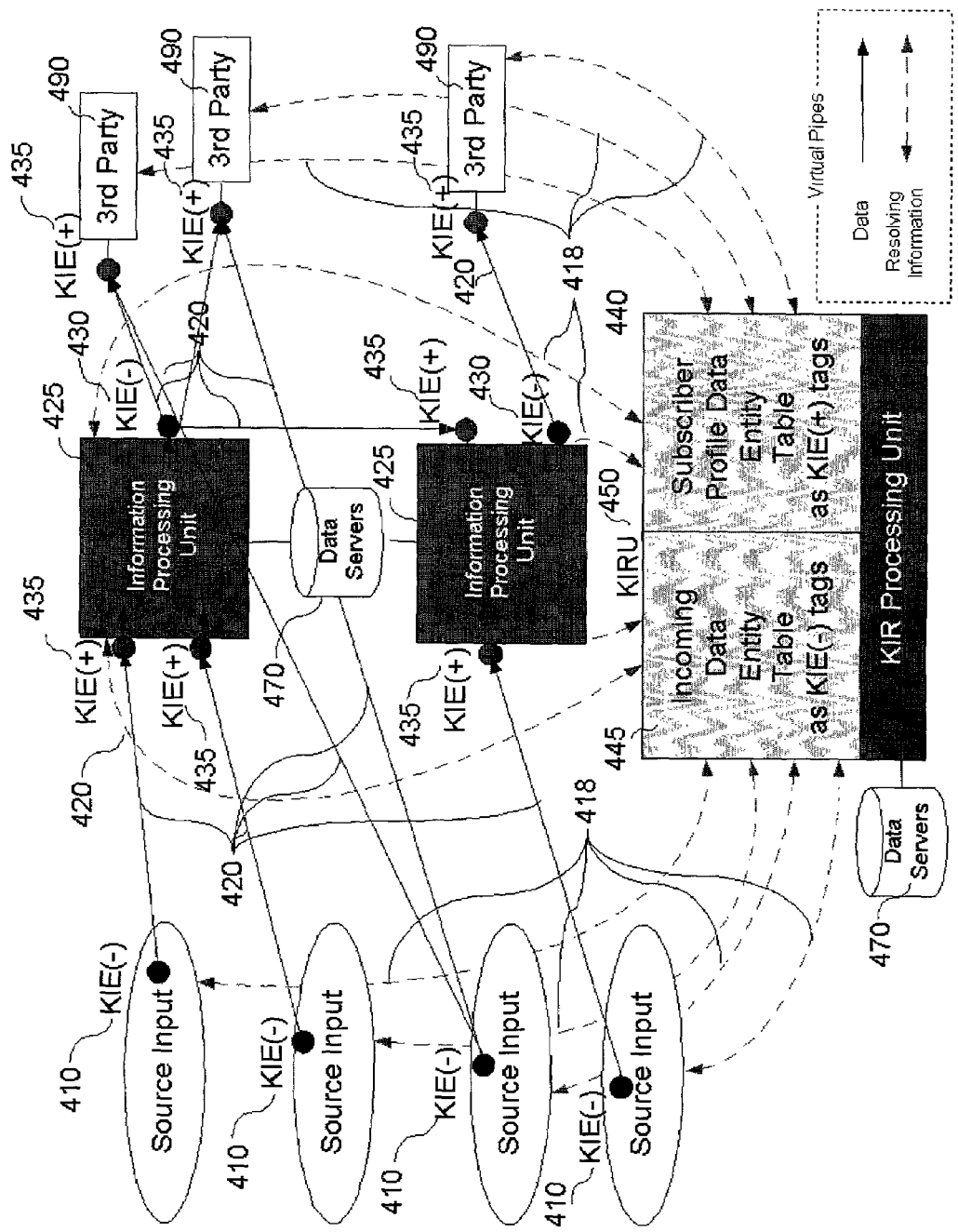
FIG. 4 is a schematic diagram of a KIN for analyzing data to/from source inputs and third parties.

FIG. 4 is a schematic diagram of a third embodiment. This embodiment shows an arrangement for analyzing data comprising: providing at least one Information Processing Network (see FIG. 2, (230)) that dynamically networks together a series of Information Processing Units (425) across a plurality of centralized and/or distributed database servers (470), and an Information Resolution Network (see FIG. 2, (255)) that dynamically networks together a series of Information Resolution Units (450, only one KIR is shown on this figure) across a plurality of centralized and/or distributed database servers (470). Incoming data is automatically analyzed. The incoming data includes raw data (410), and/or repackaged (425)/value-added data (425) from in formation source inputs. An incoming data entity information table (445) is created. The subscriber requests are collected, creating a subscriber request data entity information table (440). The KIR Processing Unit resolves the data entity table and the subscriber entity table with system logic that matches raw date (410) and/or repackaged data (430) with specific subscriber entity requests (435) for information that may relate to the event. Reporting the results of the data resolution to a plurality of centralized and/or distributed Information Processing Units (425) provides an unfolding composite picture of an event in progress, the conditions of the area that surround the event, and all ancillary data that is related to an event, or any other such data requested by a subscriber during the course of an event, providing such raw and repackaged data to Information Processing Units (425) and at least one third party (490).

The data (410) (430) is created from source inputs, data server (470), external data, the Internet, public and private reference and research networks, commercial and organizational web sites, and/or any other source of appropriate and relevant data. The appetites for information regarding an event come from a third party (490), an Information Processing Unit (425), wherein each appetite is tagged and stored in a subscriber request table (440). The Information Processing Unit (425) analyzes each data (410) (430) using such methods as mathematical formulas, logic operations, artificial reasoning, artificial intelligence, deductive and inductive reasoning, historical analysis, trend analysis, pattern recognition or any other analysis methodology. The Information Processing Unit (425) is a computing and analyzing processor that manipulates the raw data (410) (430) to render a cohesive, composite picture of an event as it unfolds, and/or calculate a related answer, as well as preserve a time slice of the event for later study and analysis. The Information Processing Unit (425) further calculates what each data element may need to properly interpret it, including drawing on data from external data servers having archival and external information systems, GIS/GPS data, geographic, governmental, economic, geological, and meteorological data, corporate web sites, public and private reference and research networks, commercial and organizational web sites, existing data of KIRU (450) and any other source of appropriate and relevant data (410), including latent data inputs from the database server (470), all compared to put the data element into a useful context.

The repackaged data and the stored data stored in the centralized and/or distributed database servers (470) operate similarly to that of the first two embodiments. In this embodiment, however, the data collection devices from the first embodiment (FIG. 1) and the sensors from second embodiment (FIG. 3) are connected to the Information Network through virtual pipes (418) and (420), to centralized and/or distributed command centers over the Internet and/or through a variety of commercial, municipal, public or private communications networks: wired, POTS, or wireless, e.g., cellular or radio, regardless of the physical deployment at each stage of the communication chain, so as to allow a subscriber or an entity (490) expressing an appetite for information to have access to the data through these devices.

The Information Resolution Network (see FIG. 2, (255)) provides reasoning technology that resolves each encounter between a data input and all known appetites for that data in real time. The Information Resolution Network further provides a Resolution Engine that resolves each encounter between requests for data and all the known inputs that could serve to satisfy the requests in whole or in part in real time. All incoming data (410) (430)), labeled KIE(−) in FIG. 4, is analyzed and information tags are created in real time and stored in a database (445) of existing data inputs that uniquely define the data element, a time/date stamp for the data element, and information on the entity that provided the data. In a similar fashion, all incoming requests for information (490), labeled KIE(+) (435) in FIG. 4, are analyzed and information tags are created in real time and stored in a lookup database (440) of existing subscriber requests that uniquely defines the request, so as to store it as a unique data element, providing a time/date stamp for the request, and information on the entity that made the request.

The Information Resolution Network (shown as (255)) in FIG. 2) includes a plurality of parallel Resolution Processing Units (450) (only one is shown in FIG. 4) that resolves each encounter with a data element (410) (430) and the request for that element (435). The number of parallel Resolution Processing Units (450) can be scaled up and down, based upon load, and are hot swappable in real time, in case of failure or network load increases. The Information Resolution Network comprising multiple Resolution Processing Units (450) are co-located, centralized and/or distributed as a single logical, Resolution Engine to work across the network to find the best matches between the raw data, the repackaged data, and appetites for this data.

The repackaged data of this embodiment is created when an event happens, when a request happens, during preprogrammed intervals or schedules, systemically and dynamically by the KIN after the assimilation and assessment of all the incoming data. This results in the repackaged data being value-added data. The value-added data includes the captured data and the composite data that describes the whole event, which is provided to the at least one third party (490). This data can be delivered in real-time or at a later time. It can be provided in a programmed broadcast or on demand, e.g., event activated. The data is stored in reserve for internal use, and for resale to at least one third party (490) at a later time.

The Information Network utilizes a push technology as explained above to provide repackaged information deemed important to all subscribers and to at least one third party (490). Pushed data is a commercial and/or public service announcement. The Information Network further provides repackaged data on demand to subscribers and to at least one third party (490). That is, the Information Network captures and utilizes data with centralized and/or distributed automatic observations from sensors in the field (410) on preprogrammed timing profiles, and on event-driven profiles and/or requests captured from subscribers or an active KIPU request (435). Dynamic subscriber requests (490) and/or automatic requests from Information Processing Units (435) can update sensor sampling schedules and/or event-driven profiles. In particular, the Information Network receives data from at least one sensor (410) according to preordained intervals, schedules, counts, and/or durations, and/or event detection by the sensor itself, and/or event detection by a sensor in another place, and/or requests captured from subscribers (435) or an active KIPU request (435). The Information Network receives data because of the onset of a predefined event, or set of cascading events, from one or more data sources (410). Moreover, the Information Network routinely samples data streams from sensors (410) in the proximity of potentially hazardous sites, e.g., a volcano, and/or near potentially affected sites, e.g., a village at the base of a volcano, according to an interval, a schedule, or because of the onset of a predefined event as measured from at least one sensor or data input source. The Information Network automatically distributes sampled, periodic and event driven data to a centralized and/or distributed command and control center where the data is stored in a plurality of database servers as shown in FIGS. 1 and 3.

Figure 5:
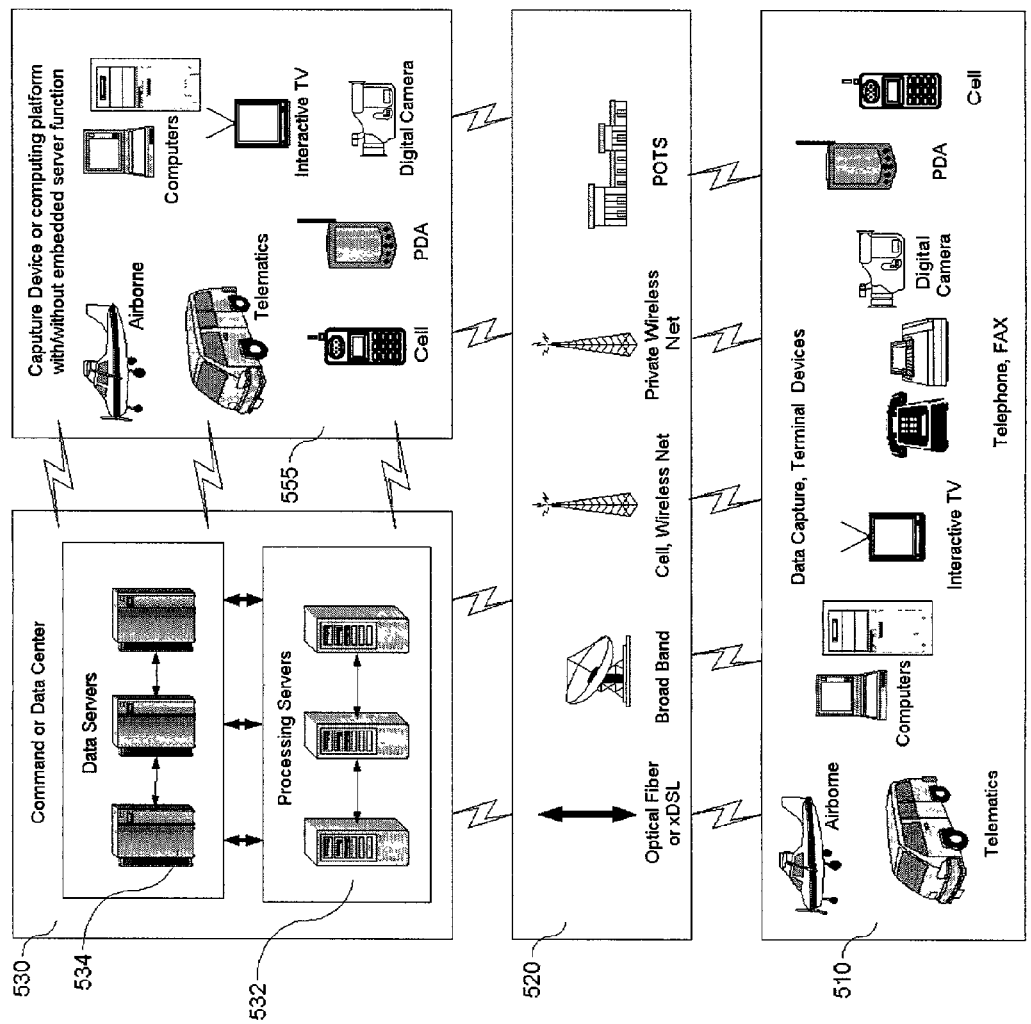
FIG. 5 illustrates a system including data servers, processing servers, information networks, and data capture devices for capturing and utilizing data.

FIG. 5 illustrates a system for capturing and utilizing data. The system comprises at least one data capturing mechanism (510, 555) to capture data related to a current event; a data sending mechanism (520) that is coupled to the data capturing mechanism (510, 555) to send the captured data to a centralized and/or distributed command center (530, 555) where the captured data is stored in a plurality of servers (534, 555) dedicated to event data; and a computing and analyzing mechanism (532, 555) that is coupled with these servers to repackage the captured data with event data indicative of an event in progress, wherein the computing and analyzing mechanism (532, 555). This computing and analyzing mechanism (532, 555) is further comprised of a controller that controls operation of the centralized command center (530), the distributed command centers (530, 555), their data capturing mechanisms (510, 555), or other computing platforms (510, 555). The source of the captured data is resolved (see reference number (418) in FIG. 4) and sent directly to another data capturing mechanism (510, 555), another computing platform (510, 555), or to both the centralized and/or distributed command center with centralized and/or distributed server processing (530, 555), respectively, and to information storage and distribution centers with little or no command and control features (see FIG. 1, (150, 155)). It should be noted that the data capturing mechanism may be one with embedded server functionality (555) or one without embedded server functionality (510) (the server is shown as reference number (530)).

The computing and analyzing mechanism (532, 555) computes and analyzes using mathematical formulas, logic operations, artificial reasoning, artificial intelligence, deductive and inductive reasoning, historical analysis, trend analysis, pattern recognition or any other analysis methodology. The computing and analyzing mechanism (532, 555) works in real time, provides the repackaged data to other consumers at a later time, or reserves the repackaged data for internal use like that of the previously described embodiments.

Captured data from the at least one data capturing mechanism (510, 555) is simultaneously sent to the centralized and/or distributed command centers (530, 555), and the source of the captured data is resolved similarly to that of the above-described embodiments (see, e.g., resolved data (418) in FIG. 4). Each of the centralized and/or distributed command centers comprises a distributed database operating with a plurality of servers. Each of the centralized and/or distributed command centers may also function as a single logical server farm or as special interest servers processing a single kind of data used by several of the servers as a single logical device that stores a comprehensive database. The current event of this embodiment is the same as the other embodiments of the inventions.

Figure 6:
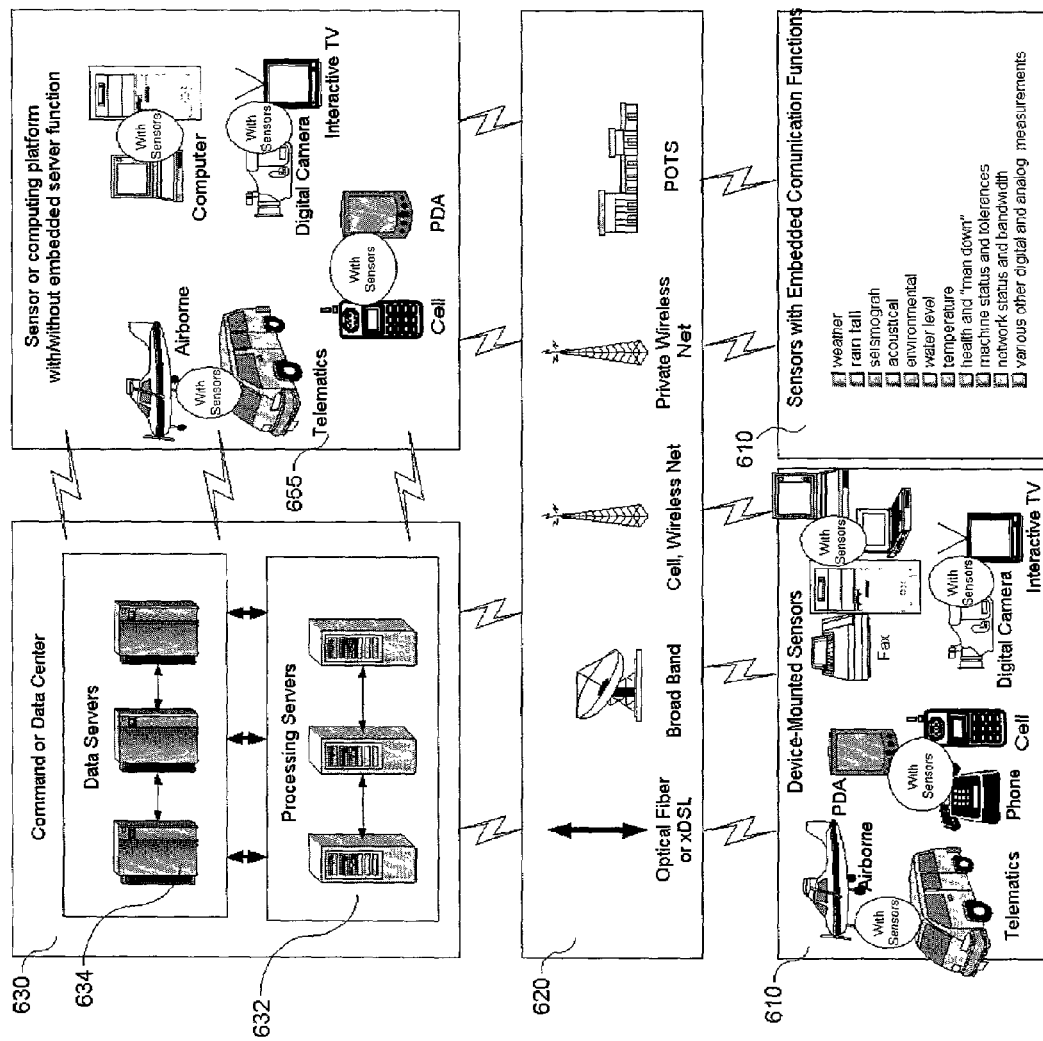
FIG. 6 illustrates a system including data servers, processing servers, information networks, and data capture devices with mounted sensors for capturing and utilizing data.

FIG. 6 illustrates yet another embodiment—a system for capturing and utilizing data comprising at least one sensor (610, 655) working in concert with, and/or in addition to, data capturing mechanisms (610, 655). In addition to capturing data of a current condition, the at least one sensor (610, 655) also measures data that may relate to an emergency condition. The system further comprises a data sending mechanism (620) that is coupled to the sensor (610, 655) to send the captured data to a centralized or a distributed command center (630), to sensor embedded server functions (655), another computing platform (610, 655), and a computing and analyzing mechanism (632, 655) that is coupled with the centralized or distributed command center to repackage the captured data with event data indicative of the event in progress. The computing and analyzing mechanism (632, 655) further comprises a controller that controls the operation of the centralized command center (630), the distributed command center (630, 655), the sensor (610, 655), or another computing platform (610, 655). The computing and analyzing mechanism (632, 655) of this embodiment functions similarly to the computing and analyzing mechanism (532, 555) of the above-described embodiment, and uses the same analysis methodologies of the above-described embodiments. Similarly to the data capturing mechanism of the above-described embodiment, the sensor may be one with embedded server functionality (655) or one without embedded server functionality (610) (the server is shown as reference number (630)).

The sensors (610, 655) may be made available to any member of the public such as a private citizen, a municipal worker, a commercial or corporate employee, a media employee, a civilian volunteer, or CERT member, a member of the military, or any other individual authorized to make measurements to capture the current condition of the event. The sensors (610, 655) may be deployed at a predetermined area to make measurements relative to any event, and the sensors (610, 655) may be worn by or attached to a person indicating the individual's status, including "man down" information, vital signs, orientation (vertical or horizontal), and GPS location information. The sensors (610, 655) are similar to the sensors of the above-described embodiments. Similarly, the current event and the predetermined areas are also similar to those of the other embodiments. It is foreseeable that the sensors may be of any electrical component to measure environmental conditions suitable for human life, with measurements taken in the vicinity of people, or any other location that may affect human life. The sensors (610, 655) capture audio, video, GIS/GPS, digital imagery, text capture, RFID information, and any other electrical signals or instrument readings. The source of the captured data is also resolved in this embodiment in the same manner as those of the above-described embodiments.

Figure 7:
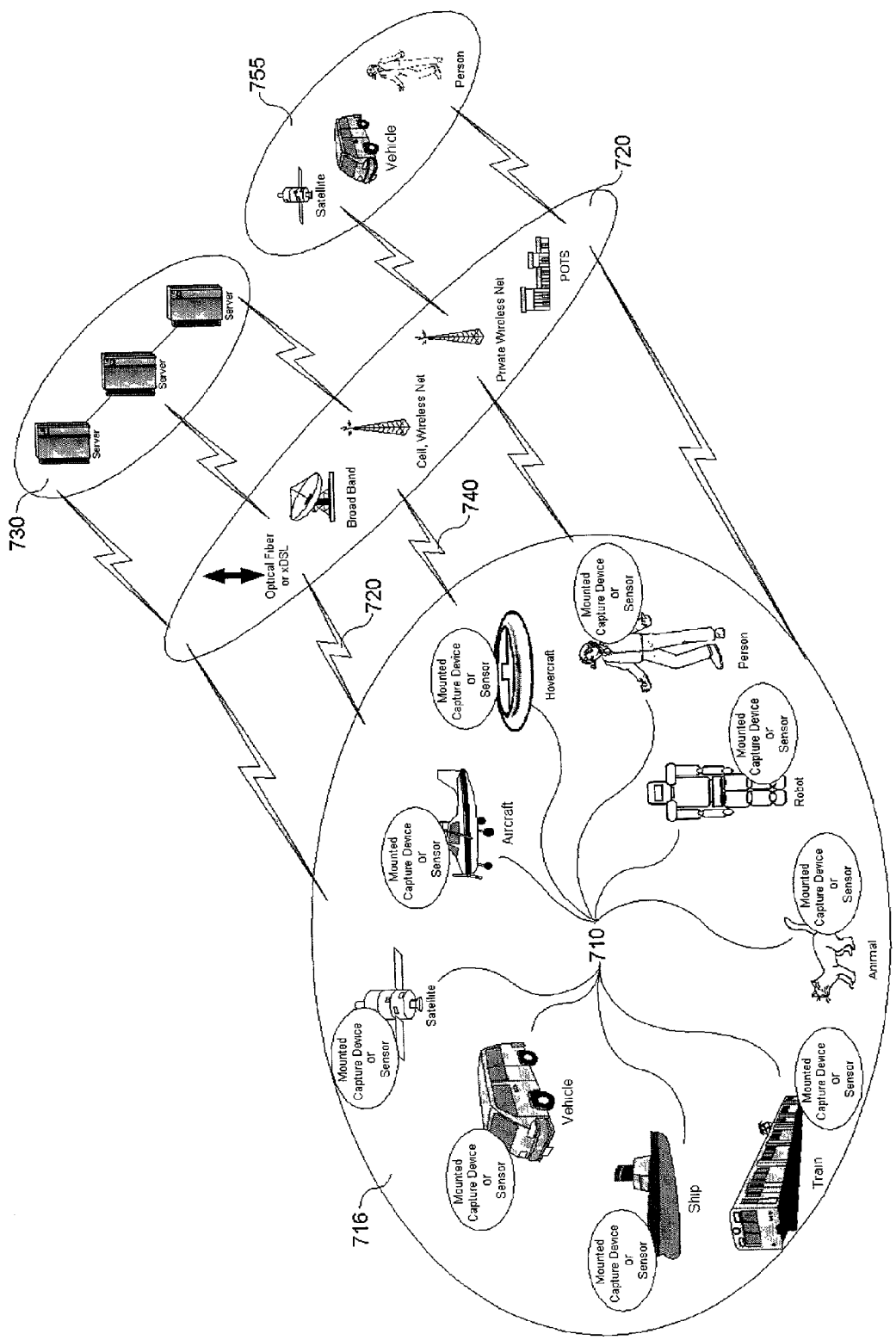
FIG. 7 illustrates mobile platforms for transporting mounted data capture devices or sensors communicating with information networks, command centers, and other mobile platforms embedded with servers.

FIG. 7 illustrates a sixth embodiment. This embodiment describes an arrangement for transporting a data capture device, a sensor, or a sensor array (710) to a current event by mounting at least one data capture device on at least one mobile platform (716). Data is captured from the at least one data capture device, sensor, or sensor array (710) related to a current event. Captured data (720) is sent to a centralized and/or a distributed command center (730) with centralized and/or distributed server processing (see, e.g., processing servers (632) in FIG. 6). The captured data may be stored at the event locally on the mobile platform (716), communicated to a resolution server to be resolved (see, e.g., resolved information (418) in FIG. 4), sent to the centralized and/or distributed servers (730) and/or mobile platforms with embedded server functions (755), dedicated to event data, repackaged with other captured event data indicative of an event in progress, and/or the repackaged data (740), including the captured data and the event data, which may then be sent to at least one third party (see, e.g., third party (490) in FIG. 4).

The mobile platform (716) may be a satellite in low earth orbit, a satellite in a parabolic orbit, a station keeping movement of a satellite without defined orbit, or a satellite in a geo-synchronous orbit. The mobile platform (716) may also be a person or an animal, operating in the air, on foot, in the water, or underground, wherein the person or the animal is outfitted with a wearable computer. The computer is strapped onto a harness device, a wireless device or PDA that is either handheld or mounted into protective and/or supportive clothing, or a collection of devices in a Personal Area Network that coordinates communication between discrete devices worn on the person or the animal.

The mobile platform (716) may be a piloted or a driven vehicle that is waterborne, airborne, ground-effect or land-based. The waterborne vehicle may be a submarine, a submersible, a surface ship, a water buoy, a pylon, a personal watercraft, or a floating dock, barge or vessel, or any other water borne vessel. The airborne vehicle may be a fixed wing aircraft, a rotor wing aircraft, a jet-propelled aircraft, a powered lift aircraft, or a lighter-than-air craft, or any other airborne vehicle. The ground effect vehicle may be a hovercraft, a ducted fan hovercraft, a rotor wing hovercraft, a jet-propelled hovercraft, a magnetically levitated hovercraft, or any other ground effect vehicle. The land-based vehicle may be a truck, a van, a car, a motorcycle, an ATV, a special purpose vehicle using tread, track, or mechanical walkers, a bicycle, a cart, a rail-borne car, or any other land-based conveyance.

The mobile platforms (716) may be unmanned vehicles, robots, or robotic devices or instruments. The unmanned mobile platforms are constructed such that they may be driven remotely or wirelessly, preprogrammed to travel along a prescribed route, preprogrammed for station keeping via GPS/GIS, or other geographic, radar, or wireless navigational systems. Human or artificial intelligence pilots pilot the unmanned mobile platforms remotely, and the unmanned mobile platforms may be waterborne, airborne, ground-effect or land-based vehicles, robots, robotic devices or instruments. In other words, the waterborne, airborne, ground-effect or land-based unmanned vehicles are similar to the manned vehicles except they are controlled by program, and/or remotely or wirelessly.

The mobile platforms (716) may comprise a combination of platforms operating as a fleet, including a satellite, a person or animal outfitted with a wearable device, a manned and/or unmanned vehicle working in concert, wherein the combination of platforms is controlled by command and control instructions from a control center (730) or by preprogrammed instructions.

Figure 8:
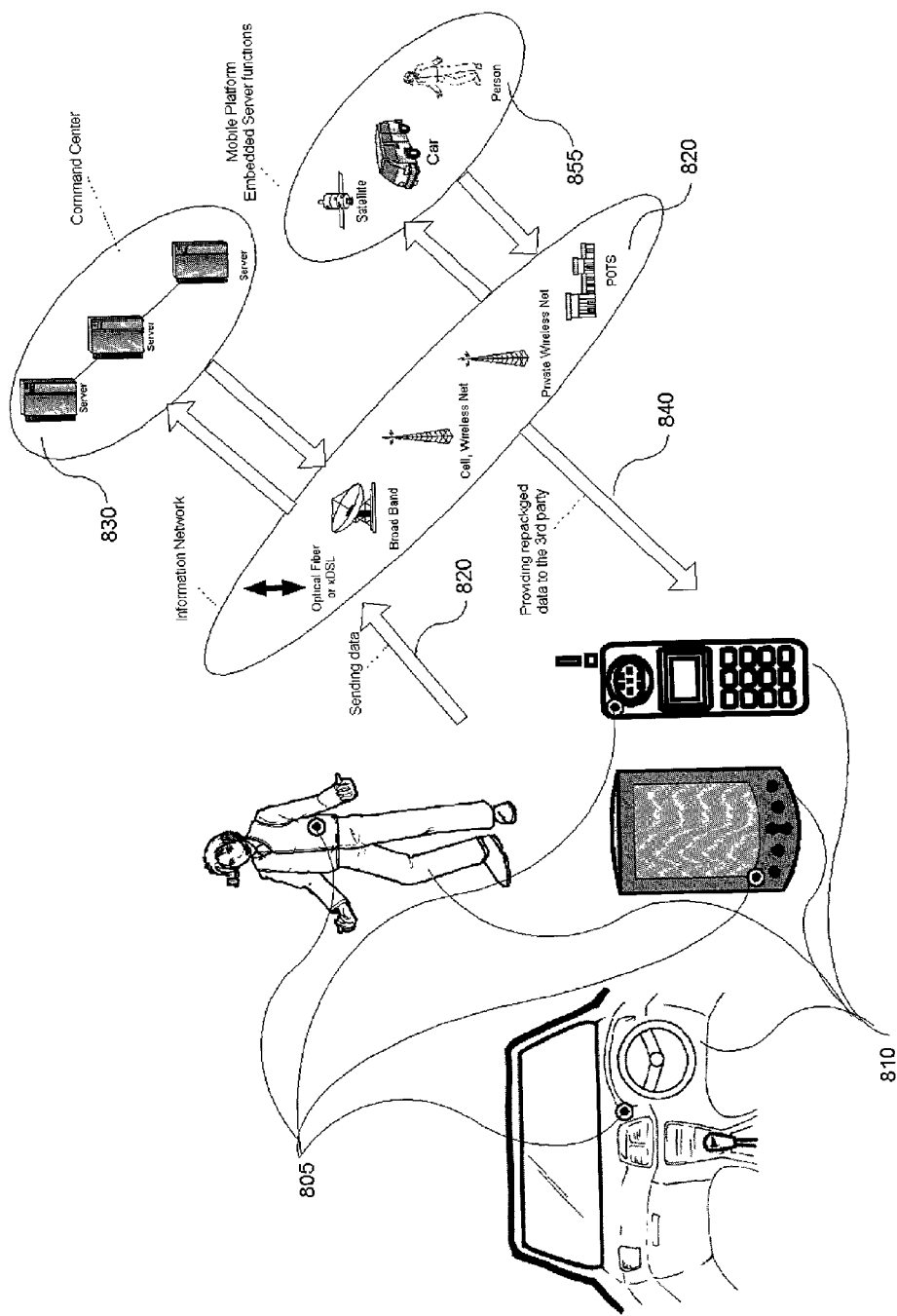
FIG. 8 illustrates a one-touch automated data collection and dissemination system communicating with an information network, command center, and mobile platform embedded with servers.

FIG. 8 illustrates a seventh embodiment. This embodiment is an automated data collection and dissemination system comprising a mechanism (810) that automates the data collection and redistribution process by a single touch of a preprogrammed button (805) on any device; a mechanism that automates the push and pull technology to broadcast or request commercial public service announcements across every commercial, municipal, military and private communication networks, the automated push mechanism including at least one wired or mobile wireless data collection and dissemination device (810), e.g., a desktop computer, a portable laptop or handheld computer, a wired camera, a data recorder and the like, a beeper, a pager, a two-way text messaging device, a wirelessly connected PDA, a cellular phone, a radio, POTS, a short-wave radio, etc. The "one touch" preprogrammed buttons (805) are installed or manufactured on devices that are held or worn by at least one individual and mounted on at least one structure or mobile platform in outer space, airborne, waterborne, ground-effect, ground and underground.

In the automated data collection and dissemination system, a human operator can push the button (805) on a dashboard or control panel of a vehicle she is driving, technology harness she is wearing, or a wireless device she is holding, to activate the system. Similarly to the above-described embodiments, the source of the captured data is resolved and sent either directly to another data capture device (810), mobile platform with an embedded server function (855), a third party including another computing platform, or to both the centralized and/or distributed command center (830) with centralized and/or distributed server processing, respectively. The captured data (820) is sent to other command or data distribution centers (see, e.g., command or data centers (150) in FIG. 1), wherein data relaying is carried out between the centers with little or no command and control features. The preprogrammed instructions broadcast data gathered by the press of the button to both the centralized and/or distributed command and control centers (830), wherein preprogrammed outputs are returned to a human operator and his entire working team as a result of the one press of the button.

Figure 9:
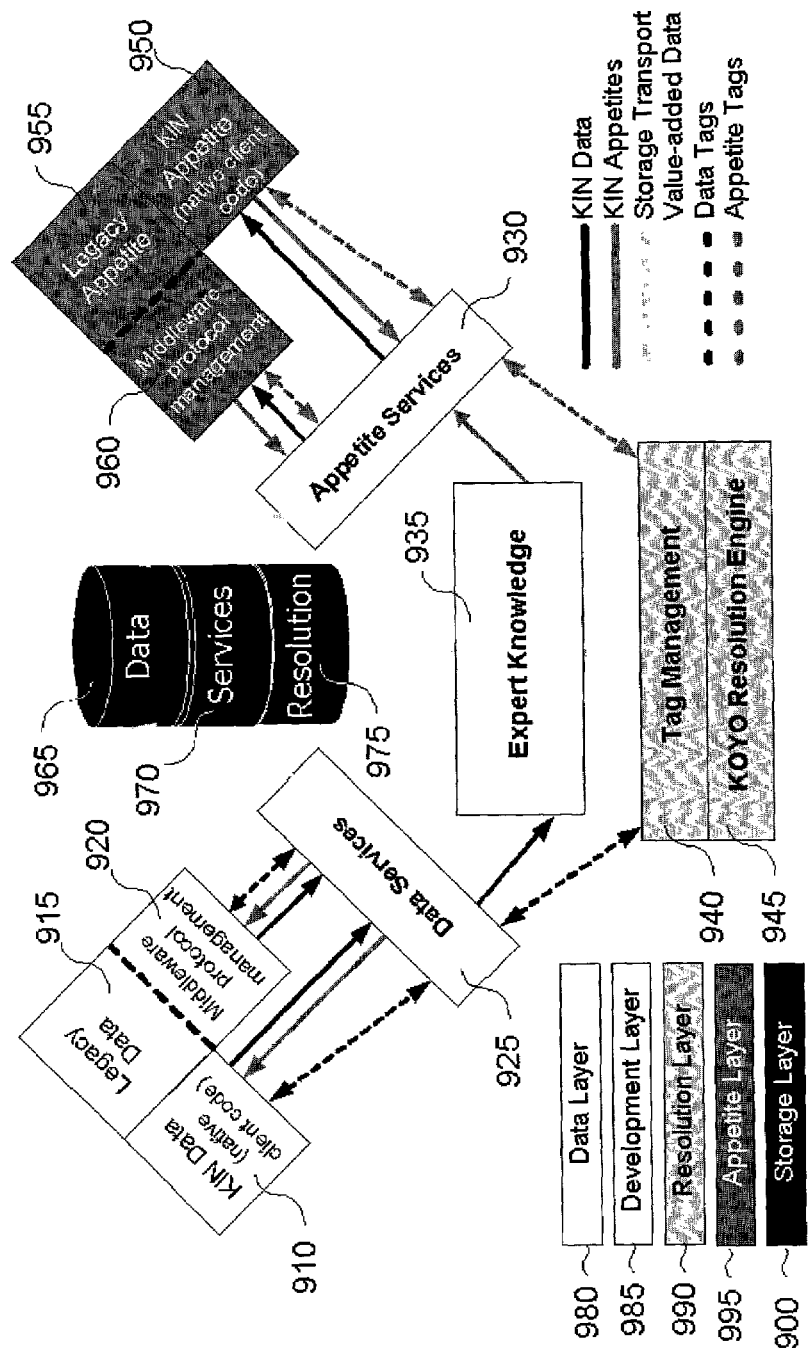
FIG. 9 provides a top-level, functional view of the KIN, including five software layers and fourteen subsystems within those layers; the figure explains in detail the Resolution Engine.

FIG. 9 provides a software layers view of the inventions. It is a top-level view that applies to all the previous embodiments and provides context for explaining the Resolution Engine. In order to make the Resolution Engine understandable and apparent to one of ordinary skill in the art, it will be helpful to establish some definitions regarding the Resolution Engine and its tag methodology.

Definitions

| | |
|---|---|
| KIN: | The KOYO Information Network, a dynamic, real time data and appetite processing resolution network. |
| Data: | A discrete element or stream of content collected by a user, a user device, sensor or sensor array fro the KIN. |
| Appetite: | A discrete or complex request or set of requests for data or information from the KIN. |
| Information: | Data that has been processed by value-added means, to meet a complex appetite request. Sometimes, discrete data doesn't meet known appetite requests, but with value-added processing (expressed as an Expert Process) it will becone "new data" and will be matched |

-continued

| | |
|---|---|
| | or resolved with an appetite for the product of the Expert Process. |
| Match: | When continuity and/or symmetry between data or information and an appetite for that data or information equals 100%. |
| Resolution, Resolved: | Any association between data and information and their appetites that remain less than 100%. The Resolution Engine resolves data with appetites for data, while simultaneously resolving known appetites for data with incoming data. Resolution is the process of putting data into the most useful context possible, expressing that context as a percentage of potential match; also, sating an appetite for information with the most appropriate data or information available, also usually expressed as a percentage of potential match, e.g., A 99% resolution means that there is a 99% probability of a match, but it is unconfirmed and therefore only 99% resolved. One discrete data element can be resolved to a thousand appetites, as a single complex appetite may be served by a thousand different data elements and the percent-probability is dynamic over time. |
| Tags: | Metadata structures that identify unique and true information about the data or the appetite and are used to identify and resolve data, information (value-added data) and appetites; tags estabish context for appetites and data and are the means of resolution. Data and information don't flow to appetites until after a resolution or match is found between and/or among the various tags. |
| Subscription: | The repository of an individual's or corporation's access, authorization, authentication, and profile that is the embodiment of citizenship in the KIN, used for both data and appetite submissions. |

The following table describes the various software layers shown schematically in FIG. 9.

| 5 Layers | Layer Description | 14 Subsystems |
|---|---|---|
| Data (980) | Data Devices (910, 915) can submit Data and Data Tags. KIN Data Devices (910) can support native KIN Protocols and code and transmit data. Legacy Data Devices (915) are not KIN aware and will have native protocols changed by middleware (920) into KIN Protocols. | KIN Data Device (910) Legacy Data Device (915) Data Middleware (920) |
| Development (985) | Data Services (925) receives inputs from the Data and Appetite Layers (980, 995) and tags them as such. Appetite Services (930) delivers any specific request for information to devices, which can accept such commands. Appetite Services (930) delivers information to the KIN and Legacy appetite devices. Expert Knowledge (935) creates new tags by various expert processes (See 194) | Data Services (925) Appetite Service (930) Expert Knowledge Services (935) |
| Resolution (990) | Data & Appetite Services (925, 930) receives notification of Data and Appetite matches from Tag Management (940) The Resolution Engine (945) bi-directionally processes the Data and Appetite Tags from Tag Management (940) | Tag Management (940) Resolution Engine (945) |
| Appetite (995) | Appetite Devices (950, 955) can submit subscriber request and profiles or receive data according to past requests. KIN Appetite Devices (950) can support native KIN Protocols and code and receive data. Legacy Appetite Devices (955) are not KIN aware and will have native protocols changed by middleware (960) into KIN Protocols. | KIN Delivery (950) Legacy Delivery (955) Appetite Middleware (960) |
| Storage (900) | Commits: Data (to 965) from Data Services (925), Appetites, Tags, and Audit Trails (to 970) from the Appetite Services (930) and Tags (to 975) from Tag management (940) and Resolution Engine Audit Trail (945). | Data Storage (965) Services Storage (970) Resolution Storage (975) |

What is claimed is:

1. A method for analyzing data, comprising:

providing at least one information network having an information processing network for dynamically networking together a series of information processing units across at least one of a centralized database server or a distributed database server, and an information resolution network for dynamically networking together a series of information resolution units across at least one of the centralized database server or the distributed database server;

automatically analyzing incoming data, wherein the incoming data includes at least one of raw data, repackaged data, or value-added data from source inputs;

creating an incoming data entity information table for publishing event information tags;

creating a subscriber request entity information table for publishing subscriber request information tags;

resolving the incoming data entity information table and a subscriber data profile entity information table with system logic that matches at least one of raw data, the repackaged data, external systems data, or programmed data with a specific subscriber entity request for information that may relate to an event;

reporting results of a data resolution to the at least one of the centralized database server or the distributed database server, providing a composite picture of the event, conditions of an area surrounding the event, ancillary data that is related to the event, or any of at least one of the raw data, the repackaged data, the external systems data, or the programmed data requested by a subscriber entity during a course of the event; and providing any of the requested data to the subscriber entity requesting the data and to at least one third party.

2. The method of claim 1, wherein data is created from at least one of a source input, external systems data, a publicly accessible network, public and private reference and research networks, commercial and organizational web sites, or any source of data. The data will be stored in an incoming data entity information table for publishing event information tags.

3. The method of claim 1, wherein appetites for information regarding the event come from the at least one third party, an information processing unit, or any other request for the raw data or the repackaged data, wherein each appetite is tagged and stored in a subscriber request entity table.

4. The method of claim 1, wherein each of the information processing units analyzes each data element using mathematical formulas, numerical calculations, logic operations, and other artificial methods including fuzzy logic, artificial reasoning, and artificial intelligence, deductive reasoning, inductive reasoning, historical analysis, trend analysis, pattern recognition, or any analysis methodology.

5. The method of claim 4, wherein each of the information processing units is a computing and analyzing mechanism that manipulates the raw data, the incoming data and archival data to render a cohesive, composite picture of an event as it unfolds, and/or calculates a related answer, and preserves a time slice of the event for later study and analysis.

6. The method of claim 1, wherein each of the information processing units calculates what each data element may need to interpret the data element, including drawing on data from external data servers including archival and external information systems, GIS/GPS, geographic, governmental, economic, geological, and meteorological data, corporate web sites, public and private reference and research networks, commercial and organizational web sites, and any source of relevant data, including data pre-existing in the entity lookup table or latent data inputs, all compared to put the data element into a useful context.

7. The method of claim 1, further comprising at least one data capture device or a sensor connected to the at least one information network through virtual pipes, to at least one of a centralized command center, a distributed command center, over a public accessible network such as the Internet, or through a variety of commercial, municipal, public and private communications networks that are wired, POTS, or wireless, regardless of the physical deployment at each stage of the communication chain.

8. The method of claim 1, wherein the subscriber entity that expressed an appetite for information is connected to the at least one information network through virtual pipes, to at least one of a centralized command center or a distributed command center, over a public accessible network such as the Internet, or through a variety of commercial, municipal, and private communications networks that are wired, POTS, or wireless, regardless of the physical deployment at each stage of the communication chain.

9. The method of claim 1, wherein the information resolution network provides reasoning technology to resolve each encounter between a data input and all known appetites for that data in real time.

10. The method of claim 1, wherein the information resolution network provides reasoning technology to resolve each encounter between requests for data and all known inputs that could serve to satisfy the requests in whole or in part in real time.

11. The method of claim 1, wherein all incoming data is analyzed and information tags are created in real time and stored in an incoming data entity information table of existing data tags that uniquely define a data element, a time and date stamp for the data element, and information on an entity that provided the data.

12. The method of claim 1, wherein all incoming requests for information are analyzed and information tags are created in real time and stored in a subscriber requests entity information table that uniquely defines a request, so as to store the request as a unique data element provided with a time and date stamp for the request, and information on an entity that made the request.

13. The method of claim 1, wherein the information resolution network comprises a plurality of parallel resolution processing units to resolve each encounter with a data element, a request for that element, or resultant repackaged data.

14. The method of claim 13, wherein a number of clustered, parallel resolution processing units can be scaled up or scaled down so as to provide burstable bandwidth, based upon a load, and are hot-swappable in real time, in case of a failure or an increase in network load.

15. The method of claim 1, wherein the information resolution network comprises of a plurality of reasoning units that are at least one of a co-located logical reasoning device, a centralized logical reasoning device, or a distributed single logical reasoning device to work across the information resolution network to find the best matches between the raw data, the repackaged data, and subscriber requests.

16. The method of claim 1, wherein the repackaged data is created when an event happens, when a request happens, during preprogrammed intervals or schedules, or dynamically by an assimilation and assessment of all the incoming data.

17. The method of claim 1, wherein the at least one information network utilizes a push technology to provide repackaged information deemed important to all subscribers and to the at least one third party.

18. The method of claim 17, wherein pushed data is at least one of a commercial announcement or a public service announcement.

19. The method of claim 1, wherein the at least one information network provides the repackaged data on demand to a subscriber and to the at least one third party.

20. The method of claim 1, wherein the at least one information network captures and utilizes data from centralized automatic observations or distributed automatic observations from sensors in a field on preprogrammed timing profiles, and on at least one of an event-driven profile, a request captured from a subscriber, or an active KIPU request, and wherein at least one of a dynamic subscriber request or an automatic request from the information processing units can update at least one of a sensor sampling schedule or an event-driven profile.

21. The method of claim 1, wherein the at least one information network receives data from at least one sensor according to at least one of a preordained interval, a schedule, a count, a duration, a request from a subscriber, or an active KIPU request.

22. The method of claim 1, wherein the at least one information network receives data as a result of an onset of a predefined event, a set of cascading events, or one or more data sources.

23. The method of claim 1, wherein the at least one information network automatically distributes sampled, periodic and event driven data to at least one of a centralized command and control center or a distributed command and control center, wherein the sampled, periodic and event data is stored in a plurality of database servers.

* * * * *